Patented Apr. 27, 1937

2,078,528

UNITED STATES PATENT OFFICE 2,078,528

RUBBER COMPOSITION AND METHOD OF PRESERVING IT

Albert M. Clifford, Stow, Ohio, assignor to Wingfoot Corporation, Wilmington, Del., a corporation of Delaware No Drawing. Application December 23, 1933, Serial No. 703,848

6 Claims. (Cl. 18—50)

This invention relates to the retarding of the ageing of deterioratable organic compositions; more particularly, to the use in rubber, balata, gutta percha, transformer oils, gasoline and other deterioratable organic compositions of age retarders or antioxidants of the kind hereinafter set forth. The substances to which the invention relates have been found by actual test to protect against deterioration from such influences as heat, light and oxygen. They have also been found in the case of rubber to materially enhance the resistance to deterioration by flexing. In general, they accomplish various desirable ends, among them, in the case of rubber, that of imparting improved tensile strength to the treated product and, in the case of gasoline, of preventing the formation of gums and gummy materials.

Substances which may be employed as antioxidants in accordance with the teachings of the present invention are, or may be regarded as, secondary and tertiary amines of the type formula (A).N.(R).X.(B) wherein (R) is an aryl or aralkyl radical attached by a single bond to N and by a single bond to X, such radical being preferably unsubstituted, but having, if desired, hydroxy, amino, nitro, halogen, alkoxy, aryloxy, aralkoxy or other substituents. Thus (R), where substituted, may be called an aromatic radical, and, where unsubstituted, an aryl or aralkyl hydrocarbon group. Where R is aryl, as distinguished from aralkyl, it will be connected to N by nuclear or ring carbon atoms. In the formula, X represents oxygen, sulphur, selenium or tellurium, all of which are members of Group VI of the Periodic System, and N stands as preferred, for a single nitrogen atom, for the nitrogen-containing group =NH, or for the nitrogen-containing group

Where N in the above formula represents the nitrogen-containing group =NH or the nitrogen-containing group

Group (A) can obviously consist of but a single radical, which may in such case be either an unsubstituted aryl radical or an aryl radical substituted by one or more hydroxy; primary, secondary or tertiary amino; nitro; halogen; alkoxy; aryloxy; aralkyloxy or like substitutents as may be desired. Where, on the other hand N represents a single nitrogen atom, Group (A) consists of two independent radicals, like or unlike, at least one of which comprises an aryl radical, either unsubstituted or substituted by one or more hydroxy; primary, secondary or tertiary amino; nitro; halogen; alkoxy; aryloxy; aralkyloxy or like substituents. Group (B) comprises in any case a radical selected from a class embracing hydrogen, alkyl, aryl, aralkyl; halogen alkyl, halogen aryl, halogen aralkyl; nitro alkyl, nitro aryl, nitro aralkyl; amino alkyl, amino aryl, amino aralkyl; hydroxy alkyl, hydroxy aryl, hydroxy aralkyl; and like radicals. Group (B) may also be a heterocyclic radical.

Falling within the scope of the invention are, for example, para hydroxy diphenyl amine, p-p' dihydroxy diphenyl amine; 2,4-diamino 4' hydroxy diphenyl amine; 3-amino 4-hydroxy diphenyl amine; 3-methyl 4-hydroxy diphenyl amine; 3-methyl 4-hydroxy 4' hydroxy diphenyl amine; 3-chlor 4-hydroxy 4' hydroxy diphenyl amine; 3-chlor 4-hydroxy diphenyl amine; 3-nitro 4-hydroxy diphenyl amine; N-chlor phenyl p-amino phenol; 3' methyl 4-hydroxy diphenyl amine; 3' ethyl 4-hydroxy diphenyl amine; 3' methyl 2,4-hydroxy diphenyl amine; p-hydroxy p' ethyl diphenyl amine; p-hydroxy p' methyl diphenyl amine; 2-4-dihydroxy diphenyl amine; 2-4-dihydroxy 4' methyl diphenyl amine; 2-4-dihydroxy 6-methyl 4' hydroxy diphenyl amine; 4-4'-dihydroxy 2-2' dimethyl diphenyl amine; 4-4'-dihydroxy 2-2'-tetra methyl diamino diphenyl amine, etc.

Others are 4-4'-dihydroxy 2-2'-dichlor diphenyl amine; 4-4'-dihydroxy 2-6-dimethyl diphenyl amine; 4-4'-dihydroxy 3-5-dimethyl diphenyl amine; 4-hydroxy 3-5-dimethyl diphenyl amine; 4' hydroxy 3-5-dimethyl diphenyl amine; 4-hydroxy 4' amino diphenyl amine; 4-hydroxy 4' dimethyl amino diphenyl amine; 4-hydroxy 4' chlor diphenyl amine; 4-hydroxy phenyl alpha naphthylamine; 4-hydroxy phenyl beta naphthylamine; p-hydroxy phenyl 1-8-dimethyl beta naphthylamine; 4-hydroxy 2-methyl phenyl beta naphthylamine; 4-hydroxy 2-6-dimethyl phenyl beta naphthylamine; phenyl p-hydroxy benzyl amine; 4-hydroxy 2-methyl diphenyl amine; 2-4-6-trihydroxy phenyl alpha naphthylamine; 4-hydroxy 4' tolyl diphenyl amine; 4-hydroxy 4' butyl diphenylamine; hydroxy naphthyl anthracyl amine; 1-8-dihydroxy dibeta naphthylamine; p-hydroxy p' methyl ditolyl amine; p-hydroxy p' ethyl diphenyl amine; p-hydroxy p' di iso propyl diphenyl amine; p-hydroxy p' methyl dinaphthylamine; phenyl naphthylol amine (alpha and beta); 7(tolyl amino) 2-hydroxy naphthalene; 7(xylyl amino) 2-hydroxy naphthalene; 2(tolyl amino) 1-hydroxy naphthalene; 2(xylyl amino) 1-hydroxy naphthalene; phenylol phenyl amine (alpha and beta); tolyl amino ethyl naphthol; xylyl amino ethyl naphthol, etc.

Still others are p-ethoxy phenyl naphthyl nitrosamine (alpha and beta); phenylol naphthylol nitrosamine (alpha and beta); p-methoxy phenyl tolyl nitrosamine; p-p'-diethoxy diphenyl nitrosamine, etc.

N-tolyl phenetidine; p-hydroxy p' methoxy diphenyl amine; p-hydroxy p' ethoxy diphenyl amine; N-phenyl phenetidine; 3-methoxy 4-hydroxy 4' hydroxy diphenyl amine; 3-methoxy 4-hydroxy diphenyl amine; 3-ethoxy 4-hydroxy diphenyl amine; p-ethoxy phenyl anthracyl amine; methoxy phenyl tolyl amine; N-xylyl phenetidine; 2-4-dihydroxy 4' ethoxy diphenyl amine; 4-4' dihydroxy 2-2' diethoxy diphenyl amine; 2-2' dihydroxy 4-4' diethoxy diphenyl amine; 4-4' dihydroxy 2-2' dimethoxy diphenyl amine; 4-4' diethoxy ditolyl amine; p-hydroxy phenyl p-methoxy benzyl amine; p-hydroxy phenyl 2-7-ethoxy alpha naphthylamine; p-butoxy phenyl tolyl amine; p-butoxy phenyl xylylamine; p-p' butoxy diphenyl amine; p-ethoxy phenyl xylyl amine; p-ethoxy phenyl alpha naphthylamine; p-p' dimethoxy ditolyl amine; p-ethoxy diphenylamine; p-p' diethoxy ditolylamine; o-ethoxy diphenylamine; p-ethoxy diphenylamine; p-ethoxy phenyl beta naphthylamine; p-ethoxy phenyl tolyl amine; N-N' ditolyl dianisidine; N-N' dixylyl dianisidine; p-ethoxy p' isopropyl diphenylamine; methoxy diphenylamine; amyloxy diphenylamine; butoxy ditolyl amine, etc.

Also, p-phenyl amino phenyl biphenyl ether; m-phenyl amino phenyl biphenyl ether; p-phenyl amino di(biphenyl) ether; mononaphthyl diamino ditolyl ether; phenoxy ditolyl amine; p-tolyl amino p' dimethyl amino diphenyl ether; p-tolyl amino diphenyl ether; p-naphthylamino ditolyl ether; p-p' di(tolyl amino) diphenyl ether; o-o' di(tolyl amino) diphenyl ether; diphenylol diamino dibenzyl ether; dibeta naphthyl diamino ditolyl ether, etc.

Typical of compounds in which a sulphur, selenium or tellurium atom replaces the oxygen in the compounds mentioned above are p-phenyl amino phenyl tolyl selenide; p-phenyl amino phenyl hydro selenide; p-phenyl amino tolyl beta naphthyl selenide; p-tolyl amino phenyl hydro selenide; p-xylyl amino phenyl hydro selenide, p-methyl amino phenyl tolyl telluride, p-methyl amino phenyl hydro telluride, p-dimethyl amino tolyl beta naphthyl telluride, p-iso amyl amino phenyl hydro telluride, p-cyclohexyl amino phenyl hydro telluride, p-amino chlor phenyl beta naphthyl telluride, etc. It is obvious that in addition to the specific compounds listed above there are selenium and tellurium counterparts for each of the oxygen compounds herein disclosed; also, that there are corresponding sulphur compounds for the various oxygen, selenium and tellurium compounds enumerated.

In general, methods for preparing the antioxidants described above will suggest themselves. For instance, para hydroxy diphenyl amine may be prepared by adding 1 mol. of undissolved hydroquinone to a mixture of 4 mols of aniline and 2 mols of calcium chloride in the absence of any solvents other than the aniline itself. The material is heated for a period of 8 to 10 hours at a temperature of 150–160 degrees C. after which the product, containing para hydroxy diphenyl amine and diphenyl p-phenylene diamine, is steam distilled in order to remove excess aniline. It is then further purified by recrystallizing from benzene or alcohol. The para hydroxy diphenyl amine portion, melting at 69–70 degrees C., is obtained in good yield.

Para para' dihydroxy diphenyl amine may be prepared similarly by reacting in the absence of solvents equimolecular quantities of hydroquinone, para amino phenol and calcium chloride in an autoclave for a period varying from 5 to 8 hours at a temperature of approximately 175 degrees C. The product, para para' dihydroxy diphenyl amine, is treated with a little hydrochloric acid and boiled with water after which it is passed through a filter in order to remove any undissolved residues and is then precipitated by the addition of an excess of common salt. The precipitate then dried is in the form of a bluish powder melting at a temperature ranging from 170–180 degrees C.

It is to be understood that the invention is not limited to any specific method of preparing the antioxidants or, regardless of illustrative references herein, to rubber. The antioxidants of the invention may be employed advantageously in substantially any of the standard rubber formulae, the following being one in which they have been found to give excellent results.

| | Parts |
|---|---|
| Extracted pale crepe | 100 |
| Zinc oxide | 5 |
| Hexamethylene tetramine | 1 |
| Sulphur | 3 |
| Stearic acid | 1½ |
| Antioxidant | 1 |

As pointed out above, they may also be employed in transformer oils, gasoline, etc.

Rubber samples prepared in accordance with the foregoing formula were subjected to vulcanization for varying periods of time and then tested to ascertain their physical characteristics. One set from each type of stock was tested immediately for tensile strength and elasticity while a second set was subjected to ageing in a Bierer-Davis bomb for 6 days in oxygen at 50 degrees C. and 150 pounds per square inch. At the conclusion of the 6 day period the samples were removed from the bomb and subjected to physical tests corresponding to those conducted upon the unaged samples.

It is evident from the following tables that rubber compositions containing even small proportions of the antioxidants of this invention resist deterioration remarkably well. Similar compositions not containing the antioxidants upon being subjected to corresponding tests increase in weight in the neighborhood of 10% and lose almost all their tensile and elongation properties. In the following data, the tests for para para' dihydroxy diphenyl amine and para hydroxy diphenyl amine were obtained from a rubber formula otherwise similar to that given above but differing therefrom in that the sulphur content was 4 parts:

| Cure in mins. 40# | Original | | Load in kgs/cm² | | Ult. tens. | Aged | | | Pct. wt. inc. |
|---|---|---|---|---|---|---|---|---|---|
| | Ult. tens. | Max. elg. | 500% | 700% | | Max. elg. | Load kgs/cm² 500% | 700% | |
| *Para hydroxy diphenylamine* | | | | | | | | | |
| 30 | 107 | 870 | 44 | ---------- | 132 | 810 | 72 | ---------- | 0.0 |
| 50 | 170 | 840 | 78 | ---------- | 182 | 770 | 126 | ---------- | 0.0 |
| 70 | 186 | 790 | 110 | ---------- | 178 | 725 | 155 | ---------- | 0.17 |
| *Para para' dihydroxy diphenylamine* | | | | | | | | | |
| 50 | 125 | 835 | 20 | 62 | 140 | 815 | 23 | 74 | 0.3 |
| 70 | 160 | 815 | 26 | 86 | 145 | 765 | 31 | 103 | 0.4 |
| *1-2-dihydroxy 4-(para hydroxy phenyl) naphthylamine* | | | | | | | | | |
| 35 | 80 | 900 | 10 | 27 | 102 | 865 | 15 | 42 | 0.02 |
| 50 | 110 | 840 | 14 | 48 | 122 | 805 | 20 | 66 | 0.09 |
| 70 | 134 | 795 | 21 | 76 | 138 | 760 | 25 | 95 | 0.11 |
| *2-methyl 4-hydroxy diphenylamine* | | | | | | | | | |
| 35 | 115 | 880 | 14 | 42 | 120 | 845 | 16 | 53 | 0.02 |
| 50 | 136 | 820 | 20 | 66 | 132 | 785 | 21 | 79 | 0.09 |
| 70 | 159 | 795 | 24 | 87 | 151 | 750 | 28 | 112 | 0.06 |
| *N-tolyl phenetidine* | | | | | | | | | |
| 35/285° | 112 | 915 | 12 | 32 | 89 | 850 | 13 | 36 | .04 |
| 50 | 116 | 825 | 17 | 55 | 122 | 840 | 17 | 55 | .17 |
| 70 | 122 | 780 | 20 | 76 | 123 | 770 | 22 | 79 | .22 |
| *N-phenyl phenetidine* | | | | | | | | | |
| 35/285° | 110 | 875 | 14 | 42 | 108 | 845 | 14 | 45 | .20 |
| 50 | 119 | 805 | 18 | 60 | 105 | 785 | 18 | 62 | .23 |
| 70 | 132 | 780 | 22 | 78 | 129 | 745 | 25 | 97 | .27 |

From the foregoing, it is evident that the compounds herein disclosed are highly suitable as age resisters of rubber and other organic products which undergo deterioration under the influences of heat, light and oxygen. Not only do the compounds of the present invention counteract the effects of such influences, but they tend to impart other highly desirable qualities, such, for example, as increased resistance to deterioration by flexing.

This application is in part a continuation of copending application Serial No. 251,472, filed February 2, 1928.

It is to be understood that as hereinafter used the term "benzenoid" embraces phenyl and naphthyl groups, which, as preferred, do or do not contain substituents, such substituents being, for example, alkyl, alkoxy, amino and like groups. Also, by the term "rubber" it is meant to include rubber, latex, balata, gutta percha, guayule, rubber isomers, rubber conversion products and similar materials. It will be apparent that numerous changes may be made in the procedure to be followed and the chemicals employed without departing from the inventive concept. It is intended that the patent shall cover, by suitable expression in the appended claims, whatever features of patentable novelty reside in the invention herein disclosed.

What I claim is:

1. A method of preserving rubber which comprises incorporating therein a hydroxy diphenyl amine.

2. A method of preserving rubber which comprises incorporated therein a para hydroxy diphenyl amine.

3. A method of preserving rubber which comprises incorporating therein a para hydroxy diamine.

4. Rubber having incorporated therein a hydroxy diphenyl amine.

5. Rubber having incorporated therein a para hydroxy diphenyl amine.

6. Rubber having incorporated therein a dihydroxy diphenyl amine.

ALBERT M. CLIFFORD.

CERTIFICATE OF CORRECTION.

Patent No. 2,078,528.　　　　　　　　　　　　　　　　April 27, 1937.

ALBERT M. CLIFFORD.

It is hereby certified that error appears in the printed specification of the above numbered patent requiring correction as follows: Page 3, second column, line 52, claim 2, for "incorporated" read incorporating; and line 55-56, claim 3, for "para hydroxy diamine" read dihydroxy diphenyl amine; and that the said Letters Patent should be read with these corrections therein that the same may conform to the record of the case in the Patent Office.

Signed and sealed this 29th day of June, A. D. 1937.

Henry Van Arsdale
Acting Commissioner of Patents.